US012067180B2

(12) United States Patent
Brehm et al.

(10) Patent No.: US 12,067,180 B2
(45) Date of Patent: Aug. 20, 2024

(54) SEAL FOR TOUCH SCREEN MODULE, TOUCH SCREEN MODULE, MONITOR AND METHOD FOR ASSEMBLING MONITOR

(71) Applicant: Fresenius Medical Care Deutschland GmbH, Bad Homburg (DE)

(72) Inventors: Winfried Brehm, Hofheim (DE); Gesa Gercke, Schweinfurt (DE); Zhongxiang Liang, Shanghai (CN); Maosong Wu, Shanghai (CN); Chaowei Zeng, Shanghai (CN)

(73) Assignee: Fresenius Medical Care Deutschland GmbH, Bad Homburg (DE)

( * ) Notice: Subject to any disclaimer, the term of this patent is extended or adjusted under 35 U.S.C. 154(b) by 0 days.

(21) Appl. No.: 17/774,054

(22) PCT Filed: Nov. 7, 2019

(86) PCT No.: PCT/CN2019/116292
§ 371 (c)(1),
(2) Date: May 3, 2022

(87) PCT Pub. No.: WO2021/087871
PCT Pub. Date: May 14, 2021

(65) Prior Publication Data
US 2022/0382400 A1    Dec. 1, 2022

(51) Int. Cl.
*G06F 3/041* (2006.01)
*G02F 1/1333* (2006.01)
*G02F 1/1339* (2006.01)

(52) U.S. Cl.
CPC ...... *G06F 3/0412* (2013.01); *G02F 1/133311* (2021.01); *G02F 1/133325* (2021.01);
(Continued)

(58) Field of Classification Search
CPC ......... G06F 3/0412; G06F 2203/04103; G02F 1/133311; G02F 1/133325; G02F 1/13338; G02F 1/1339
See application file for complete search history.

(56) References Cited

U.S. PATENT DOCUMENTS

| 2003/0020679 A1 | 1/2003 | Kojima et al. |
| 2009/0225253 A1 | 9/2009 | Oohira |

(Continued)

FOREIGN PATENT DOCUMENTS

| CN | 20501747 | 2/2016 |
| CN | 206195859 | 5/2017 |

(Continued)

OTHER PUBLICATIONS

Kangmin, WO 2012114763 A machine translation, Aug. 30, 2012 (Year: 2012).*

(Continued)

*Primary Examiner* — Peter D McLoone
(74) *Attorney, Agent, or Firm* — Fish & Richardson P.C.

(57) ABSTRACT

Disclosed is a seal for a touch screen module, comprising: a first side configured to be disposed at least at an edge of the touch screen module; and a second side opposite to the first side; wherein the second side is configured such that an outer section of the second side is to be fitted with a housing in an interference fit manner and at least a portion of an inner section of the second side is to be fitted with the housing in a non-interference fit manner. Also disclosed are a touch screen module, a monitor and an assembling method. The seal not only can achieve a good sealing effect to prevent any undesired substances from being collected at the seal and entering the interior of the monitor, but also can prevent the transparent cover from falling off from the housing due to stress generated by the seal.

17 Claims, 3 Drawing Sheets

(52) U.S. Cl.
    CPC ........ *G02F 1/13338* (2013.01); *G02F 1/1339* (2013.01); *G06F 2203/04103* (2013.01)

(56) References Cited

U.S. PATENT DOCUMENTS

| | | | |
|---|---|---|---|
| 2012/0162863 A1* | 6/2012 | Caldwell | G06F 1/169 |
| | | | 361/679.01 |
| 2012/0307183 A1* | 12/2012 | Schultz | H05K 5/0017 |
| | | | 349/84 |
| 2014/0152890 A1 | 6/2014 | Rayner | |
| 2016/0058375 A1 | 3/2016 | Rothkopf | |
| 2019/0033916 A1* | 1/2019 | Song | G06F 3/042 |

FOREIGN PATENT DOCUMENTS

| | | |
|---|---|---|
| CN | 209037500 | 6/2019 |
| EP | 2894543 | 7/2015 |
| EP | 3554055 | 10/2019 |
| WO | WO 2012/114763 | 8/2012 |
| WO | WO 2013/162504 | 10/2013 |

OTHER PUBLICATIONS

International Search Report and Written Opinion in International Appln. No. PCT/CN2019/116292, mailed Nov. 19, 2019, 8 pages.
Extended European Search Report in European Appln. No. 19951899.4, dated Jun. 29, 2023, 10 pages.

* cited by examiner

SEAL FOR TOUCH SCREEN MODULE, TOUCH SCREEN MODULE, MONITOR AND METHOD FOR ASSEMBLING MONITOR

CROSS-REFERENCE TO RELATED APPLICATIONS

The present application is the national stage entry of International Patent Application No. PCT/CN2019/116292, filed on Nov. 7, 2019, the contents of which are hereby incorporated by reference.

TECHNICAL FIELD

The disclosure relates to a seal for a touch screen module, a touch screen module, a monitor and a method for assembling the monitor.

BACKGROUND ART

A touch display panel is currently used widely in various applications, for example as a medical monitor for monitoring dialysis treatment.

The touch display panel usually comprises a touch screen module, for example a projected capacitive touch screen module and a housing holding the touch screen module. As an example, the projected capacitive touch screen module is integrated with a cover glass and a liquid crystal display (LCD) by foam bonding. The housing is usually made of plastic by injection molding. For preventing water and other undesired substances, for example disinfectant from entering the interior of the touch display panel, silicone rubber is used as a seal to seal a gap between the projected capacitive touch screen module and the housing. In addition, glue is used to bond the projected capacitive touch screen module to the housing.

However, such a known touch display panel still has water proof and hygiene problem because dust and liquid may be collected at the gap. Moreover, such a collection makes the touch display panel look ugly and is not easy to be cleaned. In particular, it is very disadvantageous in the medical field.

Other technical solutions, such as a double-shot molding needs use of an expensive tool and possibly causes excessive deformation of rubber, which deformation will result in big stress against the cover glass, thereby making the touch screen module have a risk of falling off from the housing.

SUMMARY OF THE INVENTION

In view of the problems existing in the prior art, an object of the disclosure is to provide an improved seal for a touch screen module, a corresponding touch screen module, a corresponding monitor and a corresponding method for assembling the monitor.

For achieving this object, in a first aspect, provided is a seal for a touch screen module, comprising: a first side configured to be disposed at least at an edge of the touch screen module; and a second side opposite to the first side; wherein the second side is configured such that an outer section of the second side is to be fitted with a housing in an interference fit manner and at least a portion of an inner section of the second side is to be fitted with the housing in a non-interference fit manner.

According to an optional embodiment, the seal is elastic; and/or the seal is made of silicon rubber.

According to an optional embodiment, only the outer section of the second side is configured to be fitted with the housing in the interference fit manner; and/or at least a portion of the inner section of the second side is configured to be fitted with the housing in a clearance fit manner.

According to an optional embodiment, the outer section of the second side comprises a contact rim for sealing contact with the housing; and/or the inner section of the second side is configured to be fitted with the housing in the clearance fit manner.

According to an optional embodiment, the first side is configured in a form of L-shaped structure so as to form a step portion for supporting a transparent cover of the touch screen module.

According to an optional embodiment, a corner of the L-shaped structure is configured to be spaced from the transparent cover in a fitted status; and/or the step portion is provided with a sealing portion for sealing contact with the transparent cover; and/or the transparent cover is a glass cover.

According to an optional embodiment, the sealing portion comprises at least one compressible protrusion; and/or the step portion is provided with a stress-reducing structure for reducing a stress generated by the sealing portion in the fitted status.

According to an optional embodiment, the compressible protrusion is configured as an arc-shaped protrusion; and/or the stress-reducing structure comprises a recess adjacent to the sealing portion.

According to an optional embodiment, the recess is disposed below the sealing portion; and/or the recess is configured to have a semicircular cross-section.

According to an optional embodiment, at least one longitudinal curved segment of the seal is provided with a stress-releasing structure for releasing a stress generated herein in the fitted status.

According to an optional embodiment, the at least one longitudinal curved segment comprises a corner of the seal; and/or the stress-releasing structure comprises at least one groove extending along a longitudinal direction of the seal.

In a second aspect, provided is a touch screen module, wherein the touch screen module comprises the seal described above.

According to an optional embodiment, the touch screen module is a projected capacitive touch screen module.

In a third aspect, provided is a monitor, wherein the monitor comprises the touch screen module described above.

In a fourth aspect, provided is a method for assembling the monitor described above, comprising the following steps: providing the touch screen module described above; heating the housing to expand; fitting the expanded housing onto the touch screen module; and cooling the housing.

According to the present disclosure, the seal not only can achieve a good sealing effect to prevent any undesired substances from being collected at the seal and entering the interior of the monitor, but also can prevent the transparent cover from falling off from the housing due to stress generated by the seal. Further, a rapid and easy assembly process can be achieved for the monitor.

BRIEF DESCRIPTION OF THE DRAWINGS

The disclosure and advantages thereof will be further understood by reading the following detailed description of some exemplary embodiments with reference to the drawings in which.

DETAILED DESCRIPTION OF EXEMPLARY EMBODIMENTS

Some exemplary embodiments of the present disclosure will be described hereinafter in more details with reference to the drawings to better understand the basic concept of the present disclosure.

Figure 1:
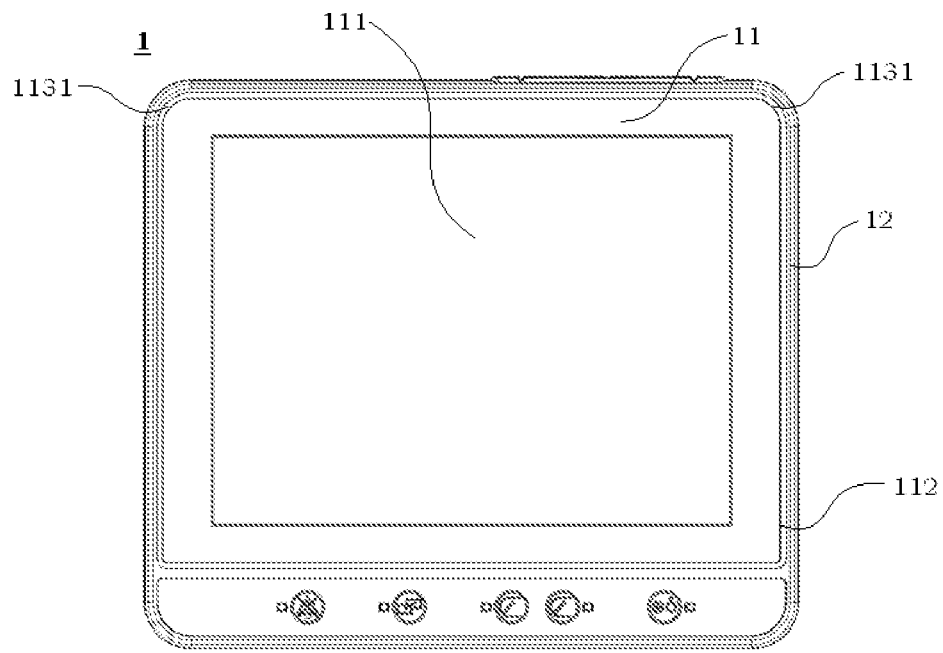
FIG. 1 exemplarily shows a touch display panel which is able to be used as a monitor, for example a medical monitor for monitoring dialysis treatment.
Figure 2:
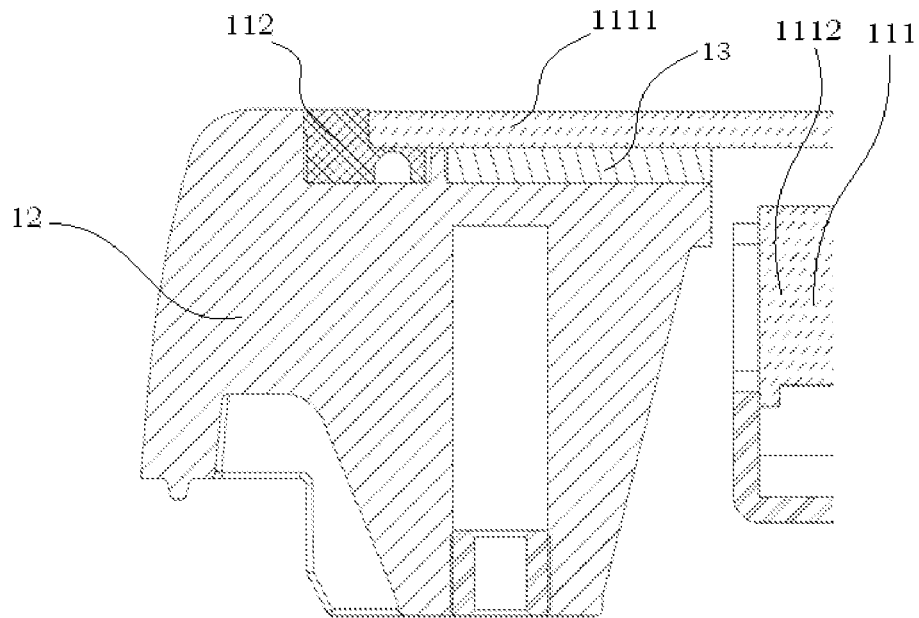
FIG. 2 shows a partial sectional view of the touch display panel as shown in FIG. 1.

FIG. 1 exemplarily shows a touch display panel 1 which is able to be used as a monitor, for example a medical monitor for monitoring dialysis treatment, and FIG. 2 shows a partial sectional view of the touch display panel 1.

As shown in FIG. 1 and FIG. 2, the touch display panel 1 mainly comprises a touch screen module 11 and a housing 12 for holding the touch screen module 11, wherein the touch screen module 11 further comprises a touch screen module body 111 and a seal 112 disposed at an edge of the touch screen module 11, more specifically disposed between the housing 12 and the touch screen module body 111 to seal a gap between the housing 12 and the touch screen module body 111 in a fitted status.

As an example, an outer surface of the seal 112 is flush with an outer surface of the housing 12 in the fitted status.

As shown in FIG. 2, the touch screen module body 111 further comprises a transparent cover 1111, particularly a glass cover and a liquid crystal display 1112 covered by the transparent cover 1111, and in the fitted status, a glue 13 is used to bond the touch screen module 11 to the housing 12. As an example, the seal 112 is disposed at outer edge of the transparent cover 1111, the glue 13 is applied between an inner side of the transparent cover 1111 and a corresponding portion of the housing 12, and the liquid crystal display 1112 and the transparent cover 1111 is bonded to each other by foam bonding.

Figure 3:
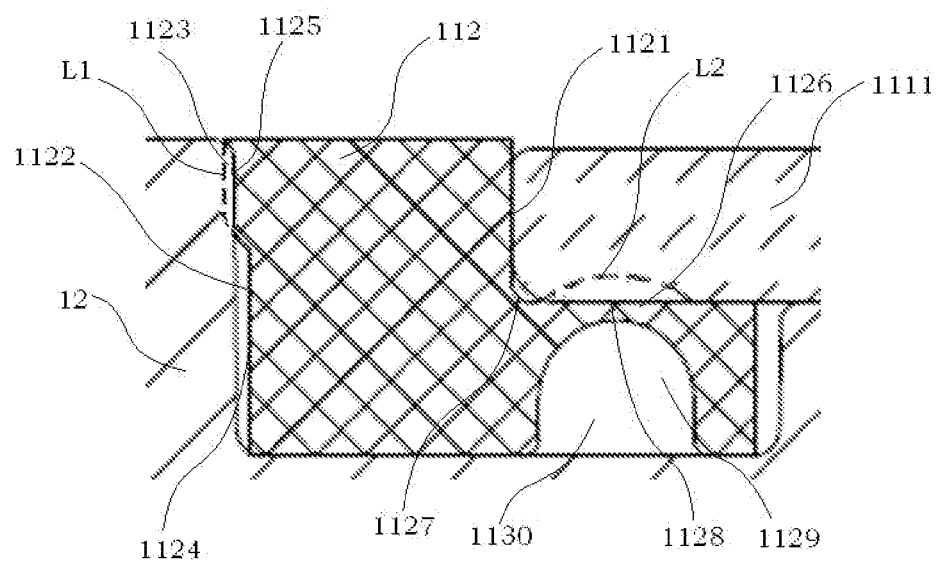
FIG. 3 shows an enlarged partial sectional view of the touch display panel to more clearly illustrate a seal according to an exemplary embodiment of the present disclosure.

FIG. 3 shows an enlarged partial sectional view of the touch display panel 1 to more clearly illustrate the seal 112 according to an exemplary embodiment of the present disclosure. As shown in FIG. 3, the seal 112 mainly comprises a first side 1121 configured to be disposed at at least an edge of the touch screen module 11 and a second side 1122 opposite to the first side 1121, wherein the second side 1122 is configured such that an outer section 1123 of the second side 1122 is to be fitted with the housing 12 in an interference fit manner and at least a portion of an inner section 1124 of the second side 1122 is to be fitted with the housing 12 in a non-interference fit manner.

It should be understood easily by the skilled person in the art that words "outer" and "inner" used in technical terms "outer section 1123" and "inner section 1124" are relative to the fitted status of the touch display panel 1. Specifically, the inner section 1124 is located closer to the interior of the touch display panel 1 than the outer section 1123.

Further, the outer section 1123 which is not compressed, i.e. in a free status is shown by a dashed line L1 in FIG. 3.

With the interference fit at the outer section 1123, tight sealing effect is achieved at the outer section 1123 to prevent any undesired substance from entering an interface between the outer section 1123 of the seal 112 and the housing 12. Moreover, the non-interference fit at the inner section 1124 is able to partially accommodate local deformation of the outer section 1123 to reduce stress applied finally onto the inner side of the transparent cover 1111.

It also should be understood by the skilled person in the art that the interference fit at the outer section 1123 is able to accommodate size variance within tolerance range. That is, the interference fit at the outer section 1123 also is able to compensate deviation of at least one of the housing 12, the touch screen module body 111 and the seal 112. Further, keeping only a section of a height of the seal 112, i.e. the outer section 1123 in the interference fit is able to make an assembly process easier as the inner section 1124 is able to accommodate the local deformation of the outer section 1123 as described above.

Moreover, main sealing force is generated in a horizontal direction, i.e. a direction parallel to the transparent cover 1111 and only small sealing force is generated in a vertical direction perpendicular to the horizontal direction so as to minimize tensile stress in the glue 13.

Obviously, it is advantageous that the seal 112 is elastic, in particular made of silicon rubber.

According to an exemplary embodiment of the present disclosure, only the outer section 1123 of the second side 1122 is configured to be fitted with the housing 12 in the interference fit manner, and/or at least a portion of the inner section 1124 of the second side 1122 is configured to be fitted with the housing 12 in a clearance fit manner, which is more advantageous for the assembly process and reduction of the stress against the transparent cover 1111.

According to an optional embodiment of the present disclosure, as shown in FIG. 3, the outer section 1123 of the second side 1122 comprises a contact rim 1125 for sealing contact with the housing 12, and/or the inner section 1124 of the second side 1122 is configured to be fitted with the housing 12 in the clearance fit manner.

As shown in FIG. 2 and FIG. 3, the first side 1121 is particularly configured in a form of L-shaped structure so as to form a step portion 1126 for supporting the transparent cover 1111 of the touch screen module 11.

According to an exemplary embodiment of the present disclosure, a corner 1127 of the L-shaped structure is configured to be spaced from the transparent cover 111 in the fitted status, which is able to make the assembly process easier.

As an additional sealing structure, the step portion 1126 is provided with a sealing portion 1128 for sealing contact with the transparent cover 111, which is able to achieve additional reliable sealing effect for preventing liquid, for example water from penetrating into the interior of the touch display panel 1.

According to an exemplary embodiment of the present disclosure, the sealing portion 1128 comprises at least one compressible protrusion. The compressible protrusion which is not compressed, i.e. in a free status is shown by a dashed line L2 in FIG. 3, and the compressible protrusion particularly is able to be flattened in the fitted status as shown in FIG. 3. As an example, the compressible protrusion is configured as an arc-shaped protrusion.

Also shown in FIG. 3, the step portion 1126 is provided with a stress-reducing structure 1129 for reducing a stress generated by the sealing portion 1128 in the fitted status, which further reduces the stress acting finally onto the inner side of the transparent cover 1111.

According to an exemplary embodiment of the present disclosure, the stress-reducing structure 1129 comprises a recess 1130 adjacent to the sealing portion 1128.

As an example, the recess 1130 is disposed below the sealing portion 1128, and/or the recess 1130 is configured to have a semicircular cross-section.

As shown in FIG. 1, the seal 112 extends longitudinally along the outer edge of the touch screen module 11 so that the seal 112 possibly has longitudinal curved segments 1131 where stress concentration occurs. In this case, as shown in FIG. 4 showing one longitudinal curved segment 1131 in a top view, at least one longitudinal curved segment 1131 of the seal 112 is provided with a stress-releasing structure 1132 for releasing a stress generated herein in the fitted status.

For example, the seal 112 is configured in a ring-shaped shape. That is, the seal 112 surrounds the entire periphery of the touch screen module body 111. In this case, the at least one longitudinal curved segment 1131 comprises four corners of the seal 112.

It should be understood by the skilled person in the art that the seal 112 is configured to only surround a portion of the periphery of the touch screen module body 111. In this case, a plurality of seals 112 will be needed to surround the entire periphery of the touch screen module body 111. For example, four seals 112 each comprising a corner are combined to surround the entire periphery of the touch screen module body 111. In this arrangement, particularly, the corner of every seal 112 is provided with the stress-releasing structure 1132.

Figure 4:
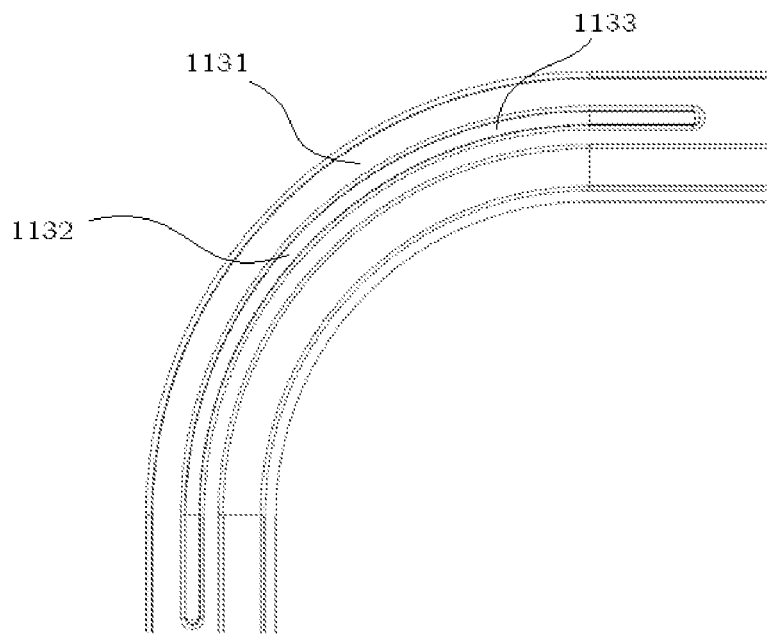
FIG. 4 shows one longitudinal curved segment of the seal in a top view.

According to an exemplary embodiment of the present disclosure, the stress-releasing structure 1132 comprises at least one groove 1133 extending along a longitudinal direction of the seal 112, as shown in FIG. 4.

The present disclosure also proposes a touch screen module 11 comprising the seal 112 described above and a monitor comprising such a touch screen module 11.

Figure 5:
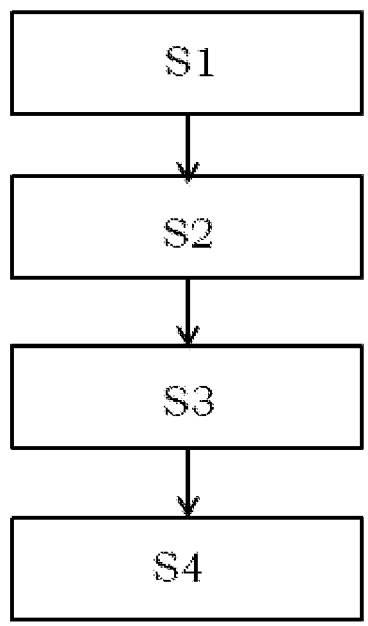
FIG. 5 shows a flow chart of a method for assembling the monitor.

Further, the present disclosure also proposes a method for assembling the monitor. As shown in FIG. 5 showing a flow chart of the method, the method comprises the following steps: S1) providing the touch screen module 11; S2) heating the housing 12 to expand; S3) fitting the expanded housing 12 onto the touch screen module 11; and S4) cooling the housing 12.

Heating the housing 12, in particular the plastic housing to expand will make the assembly process easy. Moreover, after cooling, the housing 12 will tightly hold the touch screen module 11 so that the seal 112 achieves good sealing effect.

While certain embodiments have been described, these embodiments have been presented by way of example only, and are not intended to limit the scope of the disclosure. The attached claims and their equivalents are intended to cover all the modifications, substitutions and changes as would fall within the

The invention claimed is:

1. A touch display panel, comprising:
   a touch screen module; and
   a housing for holding the touch screen module,
   wherein the touch screen module further comprises a transparent cover and a seal for the touch screen module, the seal comprising:
   a first side configured to be disposed at least at an edge of the touch screen module; and
   a second side opposite to the first side;
   wherein the second side is configured such that an outer section of the second side is to be fitted with the housing in an interference fit manner and at least a portion of an inner section of the second side is to be fitted with the housing in a non-interference fit manner;
   wherein an outer surface of the seal is flush with an outer surface of the housing in a fitted status;
   wherein the seal is disposed at outer edge of the transparent cover, and a glue is applied between an inner side of the transparent cover and a corresponding portion of the housing; and
   wherein the first side is configured in a form of L-shaped structure so as to form a step portion for supporting the transparent cover.

2. The touch display panel according to claim 1, wherein:
   the seal is elastic; and/or
   the seal is made of silicon rubber.

3. The touch display panel according to claim 2, wherein:
   only the outer section of the second side is configured to be fitted with the housing in the interference fit manner; and/or
   at least a portion of the inner section of the second side is configured to be fitted with the housing in a clearance fit manner.

4. The touch display panel according to claim 2, wherein the first side is configured in a form of L-shaped structure so as to form a step portion for supporting a transparent cover of the touch screen module.

5. The touch display panel according to claim 2, wherein at least one longitudinal curved segment of the seal is provided with a stress-releasing structure for releasing a stress generated herein in the fitted status.

6. The touch display panel according to claim 1, wherein:
   only the outer section of the second side is configured to be fitted with the housing in the interference fit manner; and/or
   at least a portion of the inner section of the second side is configured to be fitted with the housing in a clearance fit manner.

7. The touch display panel according to claim 6, wherein:
   the outer section of the second side comprises a contact rim for sealing contact with the housing; and/or
   the inner section of the second side is configured to be fitted with the housing in the clearance fit manner.

8. The touch display panel according to claim 7, wherein the first side is configured in a form of L-shaped structure so as to form a step portion for supporting a transparent cover of the touch screen module.

9. The touch display panel according to claim 6, wherein the first side is configured in a form of L-shaped structure so as to form a step portion for supporting a transparent cover of the touch screen module.

10. The touch display panel according to claim 1, wherein:
    a corner of the L-shaped structure is configured to be spaced from the transparent cover in a fitted status; and/or
    the step portion is provided with a sealing portion for sealing contact with the transparent cover; and/or
    the transparent cover is a glass cover.

11. The touch display panel according to claim 10, wherein:
    the sealing portion comprises at least one compressible protrusion; and/or
    the step portion is provided with a stress-reducing structure for reducing a stress generated by the sealing portion in the fitted status.

12. The touch display panel according to claim 11, wherein:
the compressible protrusion is configured as an arc-shaped protrusion; and/or
the stress-reducing structure comprises a recess adjacent to the sealing portion.

13. The touch display panel according to claim 12, wherein:
the recess is disposed below the sealing portion; and/or
the recess is configured to have a semicircular cross-section.

14. The touch display panel according to claim 1, wherein at least one longitudinal curved segment of the seal is provided with a stress-releasing structure for releasing a stress generated herein in the fitted status.

15. The touch display panel according to claim 14, wherein:
the at least one longitudinal curved segment comprises a corner of the seal; and/or
the stress-releasing structure comprises at least one groove extending along a longitudinal direction of the seal.

16. The touch display panel according to claim 1, wherein the touch screen module is a projected capacitive touch screen module.

17. A method for assembling the touch display panel according to claim 1, comprising the following steps:
providing the touch screen module of the touch display panel according to claim 1;
heating the housing to expand;
fitting the expanded housing onto the touch screen module; and
cooling the housing.

* * * * *